Jan. 21, 1936.  R. R. STEVENS  2,028,631
FLUID PRESSURE BRAKE
Filed March 24, 1933
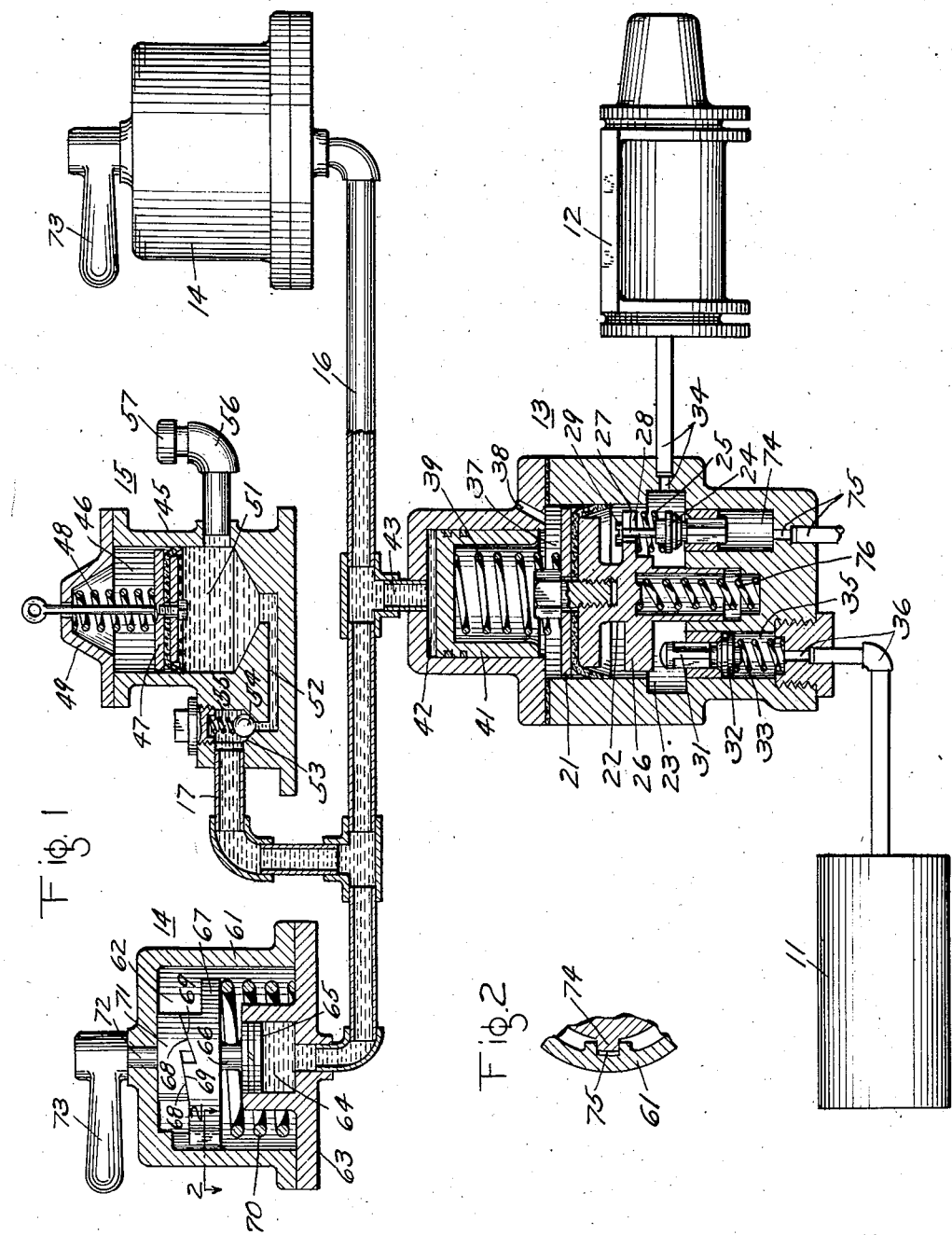
INVENTOR
ROY R. STEVENS
BY Wm. M. Cady
ATTORNEY Patented Jan. 21, 1936

2,028,631

UNITED STATES PATENT OFFICE 2,028,631

FLUID PRESSURE BRAKE

Roy R. Stevens, Forest Hills, Pa., assignor to The Westinghouse Air Brake Company, Wilmerding, Pa., a corporation of Pennsylvania Application March 24, 1933, Serial No. 662,479

2 Claims. (Cl. 60—54.6)

This invention relates to fluid pressure brakes and particularly to the control apparatus for the brake equipment of motor driven passenger coaches and the like.

Motor driven passenger coaches or cars are equipped with a main reservoir for storing a supply of compressed air, a brake cylinder device for operating the brake equipment on the car and self-lapping control valve devices disposed at each end of the car for controlling the delivery of fluid from the main reservoir to the brake cylinder and from the brake cylinder to the atmosphere. It has been proposed to provide a single brake valve device placed at one end of the car and to control it manually by foot pedals or hand levers disposed in the driver's cab at each end of the car, the foot pedals and hand levers being connected to the controlling valve by means of cables or rods and levers associated with interlocking mechanism which permits independent operation of the brake valve device from either cab of the car.

Because of the disposition of the brake valve device and the operating levers and pedals therefor, considerable pivotally mounted mechanical linkage is required and the brake valve device is placed at such a great distance from the brake cylinder that there is an appreciable time delay between the time at which the brake valve is operated and the time at which sufficient fluid is supplied to the brake cylinder to cause application of the brakes. The arrangement also necessitates the use of considerable piping, leading from the main reservoir to the control or brake valve device and back to the brake cylinder.

It is an object of this invention to provide an improved control apparatus for brake equipment for a motor driven coach or car wherein the usual mechanical linkage between the operating levers or pedals and the brake valve device is eliminated and the length of piping required materially reduced, and wherein the brake valve device may be located immediately adjacent the brake cylinder and the main fluid supply reservoir so that there is substantially no time delay between the time of operation of the brake valve device and the actual application of the brakes.

A further object of the invention is to provide a control equipment having the above noted characteristics wherein the construction of the various elements constituting the equipment is simple and relatively inexpensive so that the control apparatus may be installed upon a motor driven coach or car with a material saving in cost.

These and other objects of the invention that will be made apparent throughout the further description thereof are attained by means of the apparatus hereinafter described and illustrated in the accompanying drawing; wherein, Fig. 1 is a diagrammatic sectional view partially in elevation, showing the improved control equipment associated with a main reservoir and brake cylinder of a fluid pressure brake system;

Fig. 2 is a fragmental sectional view taken on the line 2—2 of Fig. 1 and showing a detail of the manually operated pressure generating device for causing actuation of the brake valve.

Referring to the drawing, the improved control apparatus comprises a main reservoir 11 containing a supply of compressed fluid or air, a brake cylinder device 12 containing the usual brake operating piston, not shown, a self-lapping brake or controlling valve device 13, a manual brake valve operating device 14 and a liquid storage device 15. As indicated in the drawing, two manual brake valve operating devices 14 are shown, one being disposed in each of the driver's cabs located at opposite ends of the car, the devices being connected by a pipe or conduit 16 which is connected to the operating chamber 25 of the self-lapping brake valve device 13 for a purpose that will hereinafter appear. The liquid storage device 15 is connected to the pipe 16 by a branch pipe 17 and serves to maintain a proper quantity of fluid or liquid such as oil, in the brake valve device operating system.

The brake valve device 13 may comprise a casing in which a piston 21 is operatively mounted, said piston having a stem 22 contained in a chamber 23 at one side of the piston. Also contained in the chamber 23 is a release valve 24, which is urged toward its seat by the action of a coil spring 25, which is interposed between the inner end of a flange 26 on the piston stem and the valve 24. This valve is provided with a stem 27 which extends through a slotted opening 28 formed in the flange 26 of the piston stem and at its end is provided with an enlargement or head 29 with which the flange 26 is adapted to engage to unseat the valve. The opening 28 is made large enough to permit the piston stem 22 to move freely relative to the valve stem 27 until such time as the flange 26 engages the head 29 of the stem. The inner end of the piston stem or flange 26 is adapted to engage the end of a fluted stem 31 of a fluid pressure supply or application valve 32, which is contained in the valve chamber 23 and which is urged toward its seat by the action of a coil spring 33.

The chamber 23 is connected to the brake cylinder 12 by means of a passage and pipe 34 and the chamber 35 containing the valve 32 is connected to the main reservoir 11 by a passage and pipe 36.

At the other side of the piston 21 there is a chamber 37 which is open to the atmosphere through a passage 38 and which contains a regulating spring 39. The spring 39 is interposed between and engages one side of the piston 21 and the inner end of a piston plunger 41 slidably mounted in the casing and which is subject to the pressure of the liquid in the chamber 42, which is connected to the pipe 16 by means of a branch pipe 43. It will here be noted that the piston 21, through the medium of the stem 22 and flange 26, controls the operation of the release and application valves 24 and 32 respectively, and that the spring 39 controls the operation of the piston in accordance with the operation of the plunger 41.

The liquid storage device 15 is provided for supplying liquid to the pipe 16 and chamber 42 and for maintaining against possible leakage, a full supply of liquid in the pipe 16 and associated chambers. The liquid storage device 15 may comprise a casing 45 having a chamber 46 containing a piston 47 slidably mounted therein and biased toward its inner position by a spring 48 interposed between the piston 47 and the cover 49 of the casing 45. The chamber 51 at the inner side of the piston 47 is filled with an operating liquid such as oil, and is connected to the branch pipe 17 by means of a passage 52 and chamber 53 containing a ball check valve 54 that is normally biased in closed position by a spring 55.

The chamber 51 is provided with a filling pipe 56 that may be closed by a threaded cap 57. In the event of leakage of fluid from the pipe 16 or its associated chambers, the piston 47 acted upon by the spring 48 forces liquid from the chamber 51 through the passage 52 and chamber 53 past the ball check valve 54 into the branch pipe 17 to the pipe 16. Thus the liquid control system is constantly supplied with the proper amount of operating fluid or liquid.

The manual brake valve operating device 14 comprises a casing 61 having a chamber 62 that is closed by a cover plate 63 having a chamber 64 containing a piston 65 provided with a stem 66 which carries a cam plate 67. The cam plate is provided with cam surfaces 68 for engaging the cam surfaces 69 of an operating cam 71 contained within the chamber 62, and which is provided with an exteriorly extending stem 72 to which an operating handle 73 is attached. A spring 70, interposed in chamber 62 between the cam plate 67 and the cover plate 63, yieldingly urges the cam plate into contact with the operating cam 71. The cam plate 67 is provided with a peripheral lug 74, Fig. 2, which slidably engages a groove 75 in the casing 61 and prevents the rotary movement of the cam plate 67. Rotation of the operating handle 73 and cam 71 in a counter-clockwise direction causes the cam plate 67 to be depressed and to force the piston 65 into the chamber 64 and to increase the pressure of the fluid or liquid in the pipe 16 so as to force the plunger 41 in the chamber 42 inwardly and cause, through the action of the spring 39, inward movement of the piston 21. The inclination of the cam surfaces 68 and 69 on the cam plate 67 and operating cam 71 is such that the pressure of fluid developed in chamber 64, as a result of movement of piston 65 into chamber 64, and the force of spring 70 are ineffective to exert sufficient turning moment on operating cam 71, reversely through piston 65 and cam plate 67, to rotate the cam 71 and handle 73 in a direction to permit piston 65 to be moved outwardly in chamber 64 when the manual force applied to rotate handle 73 to move piston 65 into chamber 64 is relieved. Thus handle 73 always remains in the position into which it is rotated. The ball check valve 54 prevents a back flow of fluid from the pipe 16 into the chamber 51 of the storage device.

In operation, with the parts of the apparatus in the running position, as shown in the drawing, and with the release valve 24 open and the application valve 32 closed and the brakes released, the brake cylinder 12 is open to the atmosphere through pipe and passage 34, chamber 23, past the open release valve 24, chamber 74 and passage and pipe 75 which leads to the atmosphere.

In order to apply the brakes, the operating handle 73 of the manual brake valve operating device 14 is rotated in a counter-clockwise direction and the cam plate 67 and piston 65 are depressed so that fluid is forced from the chamber 64 into the pipe 16 and into the chamber 42, thus causing the piston 41 to be moved inwardly and compress the spring 39. The force exerted by the spring 39 upon the piston 21 causes it to be moved inwardly against the action of the spring 76. Initial movement of the piston 21 causes the valve 24 to seat and close communication from the brake cylinder to the atmosphere. Subsequent movement of the piston 21 causes the flange 26 to engage the stem 31 of the application valve 32 and to open the valve so that fluid under pressure may flow from the main reservoir 11 to the brake cylinder 12 through pipe and passage 36, chamber 35, past the open application valve 32, chamber 23 and passage and pipe 34.

The inward movement of the piston 21 is proportional to the inward movement of the piston 65 of the manual brake valve operating device and the force with which the piston 21 is maintained in application position is proportional to the pressure of the liquid in the pipe 16 and chamber 42. Accordingly, when the brake cylinder pressure within the chamber 23 builds up to a predetermined value, the pressure of the fluid acting on the inner face of the piston 21 will move the piston 21 outwardly against the action of the spring 39 and permit the application valve 32 to be moved to its seat, by the spring 33. Since there is a lost motion connection between the flange 26 and the stem 27 of the release valve 24, the limited upward movement of the piston 21 and flange 26 does not lift the valve 24 from its seat. From the foregoing it is apparent that the brake valve device is self-lapping and that the pressure in the brake cylinder is proportional to the degree of depression of the cam plate 67 or the amount of movement of the operating handle 73 toward application position.

If it is desired to increase the brake cylinder pressure, the operating handle 73 is rotated further in a counter-clockwise direction, thereby further depressing the cam plate 67 and piston 65 and increasing the pressure of the liquid in the chamber 42, thereby further depressing the piston 41 and increasing the pressure exerted by the spring 39 on the piston 21. The inward movement of the piston 21 again causes the application valve 32 to move to open position and permit fluid under pressure to flow from the main reservoir 11 to the brake cylinder in the manner described.

In order to release the brakes, the operating handle 73 is returned to release position shown in the drawing, thus relieving the pressure in the pipe 16 and chamber 42 and permitting the spring 76 to force the piston 21 to release position shown in the drawing. The spring 39 then forces the piston 41 to its outer position as shown. The movement of the piston 21 to release position causes the flange 26 to disengage from the stem 31 and cause the application valve 32 to close. The same outward movement of the piston causes the flange 26 to engage the enlarged head 29 of the stem 27 of the release valve 24 and lift the release valve from its seat, thereby opening the brake cylinder to the atmosphere in the manner previously described.

By arranging the parts of the apparatus so that the brake cylinder and the main reservoir are relatively close together and by placing the brake valve device immediately adjacent the brake cylinder, there is substantially no time delay in supplying fluid under pressure to the brake cylinder when the brake valve application valve is opened, and since the brake valve is operated by liquid under pressure, the manual brake valve operating devices may be located at any convenient remote point such as the cabs at opposite ends of the car. As a result of this construction, relatively expensive mechanical connections are dispensed with and the cost of the equipment is reduced. There are fewer mechanical parts to get out of order and the brake equipment responds more quickly to the operation of the manual brake valve control devices.

While but one embodiment of the invention is disclosed herein, it is obvious that changes may be made in the construction without departing from the spirit of the invention.

Having now described my invention, what I claim as new and desire to secure by Letters Patent, is:

1. A fluid pressure impulse device comprising a casing having a cylinder, a piston within said cylinder having a cam member thereon, a manually operated rotary cam member mounted on said casing and adapted to engage and cooperate with said cam member on the piston for moving said piston against the pressure of fluid acting thereon, said cam members cooperating to retain the piston in any position to which it is moved against the pressure of said fluid, and without the application of operating force.

2. A fluid pressure impulse device comprising a casing having a piston chamber, a piston movable in said chamber to apply pressure to fluid within the chamber, a cam member movable only in an axial direction for effecting movement of said piston, and a rotary cam member, said cam members having cooperating cam surfaces effective upon rotary movement of said rotary cam member to cause axial movement of said first cam member resulting in movement of said piston to apply pressure to the fluid within the piston chamber, and effective to retain said piston in any position to which it is moved, without the necessity of maintaining a moving force on said piston in opposition to the pressure of the fluid within the piston chamber.

ROY R. STEVENS.